US007309369B2

(12) United States Patent
Eder

(10) Patent No.: US 7,309,369 B2
(45) Date of Patent: Dec. 18, 2007

(54) FILTER MODULE

(75) Inventor: Michael Eder, Lienz (AT)

(73) Assignee: Brain Flash-Patententwicklungs GmbH, Lienz (AT)

( * ) Notice: Subject to any disclaimer, the term of this patent is extended or adjusted under 35 U.S.C. 154(b) by 348 days.

(21) Appl. No.: 10/962,266

(22) Filed: Oct. 9, 2004

(65) Prior Publication Data

US 2005/0229560 A1    Oct. 20, 2005

Related U.S. Application Data

(63) Continuation of application No. PCT/AT03/00071, filed on Mar. 12, 2003.

(30) Foreign Application Priority Data

Apr. 9, 2002    (AT) .............................. A 546/2002

(51) Int. Cl.
*B01D 46/00* (2006.01)
*B01D 50/00* (2006.01)

(52) U.S. Cl. .................. 55/495; 55/325; 55/341.1; 55/361; 55/385.1; 55/467; 55/471; 55/478; 55/481; 55/484; 55/497; 55/503; 55/515; 55/528; 55/DIG. 31

(58) Field of Classification Search .............. 55/320, 55/323, 325, 341.1, 341.3, 341.5, 361, 385.1, 55/443, 445, 465, 467, 471, 478, 479, 480, 55/481, 482, 483, 484, 490, 495, 497, 498, 55/503, 512, 515, 522, 527, 528, DIG. 31
See application file for complete search history.

(56) References Cited

U.S. PATENT DOCUMENTS 1,747,364 A * 2/1930 Greene ........................ 55/483

| 3,871,849 A * | 3/1975 | Smith et al. ................... 55/484 |
| 3,961,924 A * | 6/1976 | Alskog ........................ 55/500 |
| 4,269,615 A * | 5/1981 | Zboralski et al. .............. 55/496 |
| 4,469,084 A * | 9/1984 | Gillotti ........................ 55/473 |
| 5,141,540 A | 8/1992 | Helmus |
| 5,332,409 A * | 7/1994 | Dralle .......................... 55/484 |
| 5,505,755 A * | 4/1996 | Ernst ..................... 55/DIG. 31 |
| 5,601,717 A | 2/1997 | Villette et al. |
| 6,162,270 A | 12/2000 | Nystrom et al. |
| 6,402,811 B1 * | 6/2002 | Shanks et al. ................ 55/515 |

(Continued)

FOREIGN PATENT DOCUMENTS

DE    34 39 255 A1    4/1986

(Continued)

OTHER PUBLICATIONS

International Search Report for corresponding International Application No. PCT AT03/00071, 2003.

*Primary Examiner*—Jason M. Greene
(74) *Attorney, Agent, or Firm*—Wenderoth, Lind & Ponack, L.L.P.

(57) ABSTRACT

The invention relates to a filter module in the form of a hollow body with at least one chamber. The walls of the hollow body are made of a non-metallic material that can be comminuted and/or disintegrated in a recycling process. The material is a paper product, such as cardboard, paper or paperboard, or a fibrous material, such as wood or pressboard material.

26 Claims, 2 Drawing Sheets

U.S. PATENT DOCUMENTS 6,966,939 B2 * 11/2005 Rammig et al. ............... 55/527
2005/0178268 A1 * 8/2005 Beier ........................... 55/483

FOREIGN PATENT DOCUMENTS

| | | |
|---|---|---|
| DE | 37 40 249 C1 | 11/1988 |
| DE | 38 16 434 A1 | 11/1988 |
| DE | 37 83 487 T2 | 5/1993 |
| DE | 195 29 618 C1 * | 2/1997 |
| DE | 197 01 994 A1 | 7/1998 |
| EP | 0 082 106 A2 | 12/1982 |
| EP | 0 237 923 B1 | 1/1993 |
| GB | 1460925 | 1/1977 |
| GB | 2 194 902 A | 3/1988 |
| JP | 09 308 813 | 12/1997 |

* cited by examiner

FILTER MODULE

CROSS-REFERENCE TO RELATED APPLICATIONS

This application is a continuation of International Application No. PCT/AT03/00071, filed Mar. 12, 2003, which claims the benefit of Austrian Application No. A 546/2002, filed Apr. 9, 2002, filed Apr. 9, 2002, the contents of which are incorporated by reference in their entirety.

BACKGROUND OF THE INVENTION

The present invention relates to a filter module in the form of a hollow body with at least one chamber.

Filter devices have for some time been known, in particular, for spraying cabins in which a large portion of the spray material which has not adhered to the object being sprayed contaminates the air in the spray cabin. U.S. Pat. No. 6,162,270 discloses for example a filter system into which filter modules can be inserted to clean the air removed from the spray cabin. The filter modules used can be removed as required and chemically or thermally cleaned. Depending on the type of cleaning used, the filter modules consist of high-temperature-resistant (for example metals) or chemical-resistant (for example glass-fibre reinforced plastic) material. In this context, it is problematic that separate devices are to be provided to clean the filter modules, which is expensive both technically and economically.

SUMMARY OF THE INVENTION

The object of the invention is to create a filter module which can be exchanged with little technical expenditure and at low cost.

According to the invention, this is achieved in that the walls of the hollow body consist of a non-metallic material which can be reduced or dissolved in a recycling process, the reducible and/or soluble material being a paper product— preferably board, paper or cardboard—or a fibrous material—preferably wood or pressboard material.

It is economically advantageous that recycling systems already operating in accordance with current economics can be used for these materials, so that no additional costs are incurred for the creation of recycling plants. It is technically advantageous that filter modules according to the invention can be produced at low cost.

If the whole filter module is made from recyclable material, it can be returned complete after use, in returnable packaging advantageously provided when it was sold, to the producer of the filter box, and then sent for recycling complete by him. This reduces the danger of contamination of the environment by toxic material from the filter module.

The use of paper product has the advantage that a filter module produced in this way has a very low intrinsic weight and can be sent for recycling in the already existing system for waste paper.

Fibrous materials are characterized by advantageous mechanical properties combined with low prime costs. Due to its high calorific value, the wood preferably used can be used in the recycling process to generate long-distance energy, which further increases the environmental friendliness of a filter module according to the invention.

A further advantageous version of the invention results from the fact that the reducible and/or soluble material is a biologically degradable material. This allows the use of existing devices for the biological degradation of a filter module according to the invention after use.

A further advantageous version of the invention results from the fact that the hollow body is roughly square. This form is particularly suitable for production by a folding procedure. Filter modules produced in this way can be sent folded from the producer to the consumer, which saves on transport costs.

A further advantageous version of the invention results from the fact that the hollow body is roughly cylindrical. Space-saving storage is also possible with this version.

A further advantageous version of the invention results from the fact that the smallest side of the hollow body is roughly half the size of its largest side. This means that the filter module has sufficient volume for the full unfolding of its filter action.

A further advantageous version of the invention results from the fact that on at least one surface of the hollow body at least one handle is attached and/or developed countersunk and able to be swung out. This simplifies the replacement of filter modules after use. Because the handle is attached and/or developed countersunk, it is secured against damage and makes a simple stackable storage possible.

A further advantageous version of the invention results from the fact that at least one wall of the hollow body is at least partially impregnated. This lengthens the life of a filter module according to the invention.

A further advantageous version of the invention results from the fact that at least one chamber of the hollow body is able to be opened. This makes it possible to replace filter material in the chamber, and thus increase the life of the whole filter module.

A further advantageous version of the invention results from the fact that at least two consecutive walls, arranged roughly parallel to each other following each other directly in the direction of the incoming air flow have filter openings which become smaller in the direction of the incoming air flow on successive walls and/or are arranged offset vis-à-vis one another (labyrinth system). The so-called screen effect, in which the material filtered out from the air blocks filter layers attached entry-side and thus reduces the overall filter capacity of the filter module, is prevented.

A further advantageous version of the invention results from the fact that at least one bag with filter material can be introduced into at least one chamber of the hollow body. Because of the introduced filter material, the filter module acquires a fine-filter function. These filter bags can be produced in different variants. Conceivable as an example, but not exclusively, are filter bags which contain filtering plates, filter balls, loose filter material, filtering charcoal, wood wool or biological filter material.

A further advantageous version of the invention results from the fact that at least one bag with filter material is able to be introduced into at least one chamber arranged in the direction of the air flow after the at least two walls arranged roughly parallel to each other. This combines the coarse-filter function achieved by the labyrinth system with the fine-filter function achieved by the filter bag, thus resulting in an optimum filtering procedure.

A further advantageous version of the invention results from the fact that at least one chamber of the hollow body is at least partially filled with filter material. Filter material, supplied for example in standardized sacks, can thereby be removed from the hollow body and introduced into the filter module in the desired quantity.

A further variation of the present invention relates to a filter system with modular structure.

In conventional, large-scale filter systems, there is the problem that filter material developed in one piece is unevenly contaminated. If the contamination value in a restricted area of the one-piece filter material has exceeded the predetermined limit value, all of the filter material must be replaced.

A further object of the present invention is therefore to create a filter system which operates at lower cost.

This is achieved according to the invention in that the body of the filter system has plug-ins for filter modules.

The economic advantage of this is that only the heavily contaminated filter modules need be removed from the filter system and disposed of.

An advantageous version of this variation of the invention results from the fact that a fan is attached to the body of the filter system. By means of the suction effect created by the fan, the amount of air passing through the filter system increases.

A further advantageous version of this variation of the invention results from the fact that the body of the filter system has two chambers, one of the two chambers being connected to the fan. This allows filter modules to be inserted into the one chamber while the other of the two chambers is connected to the fan.

A further advantageous version of this invention results from the fact that the filter modules can be inserted into one chamber up to the stops and the other chamber is connected to the fan. This prevents the filter modules from moving too far into the filter system as a result of the suction effect of the fan. Because further securing is not necessary, the replacement of individual filter modules is simplified.

BRIEF DESCRIPTION OF THE DRAWINGS

Further features and details of the present invention are found in the following description of drawings wherein:

FIGS. 2b, 2c and 2d are top views onto the planes identified in FIG. 2a;

FIG. 4b shows a lateral section through the filter system shown in FIG. 4a; and

DETAILED DESCRIPTION OF THE DRAWINGS

Figure 1A:
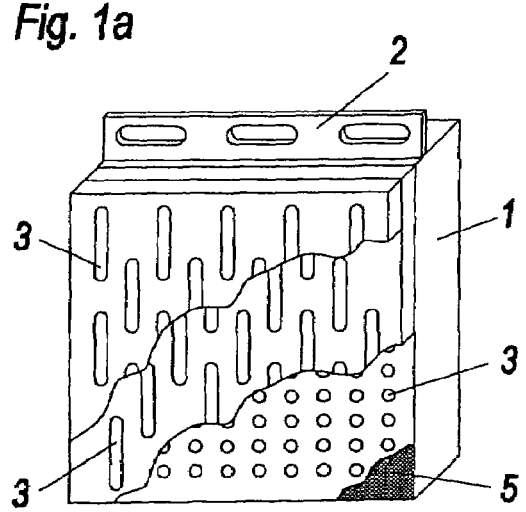
FIGS. 1a and 1b show a filter module according to the invention in perspective view and top view.
Figure 1B:
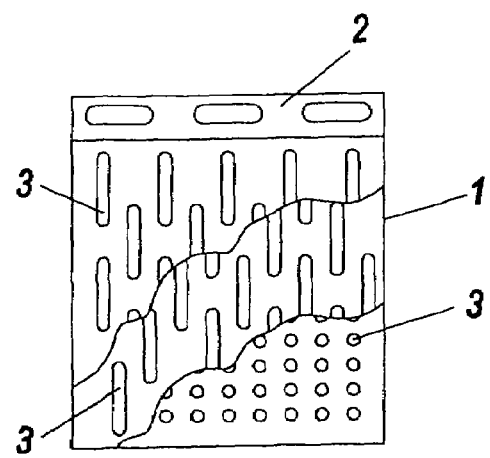

FIG. 1a shows in perspective view and in a partial exposed profile a filter module according to the invention, in which the multi-chamber structure of the hollow body 1 can be seen. The filter openings 3 on successive filter layers change in size and are arranged offset vis-a-vis one another. Filter material 5 introduced loose into a filter chamber and a swung-out handle 2 can also be seen. In FIG. 1b, the offset position of the filter openings 3 on the individual filter layers is once again to be seen.

Figure 2A:
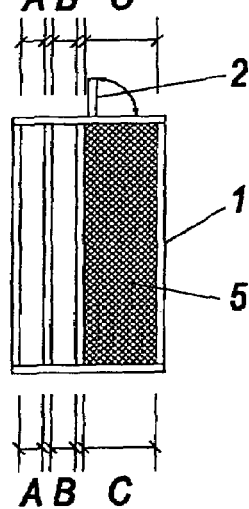
FIG. 2a shows a lateral section through a filter module according to the invention.

FIG. 2a shows a lateral section through a filter module according to FIGS. 1a and 1b. The handle 2 that can be swung out and the filter material 5 introduced loose into a filter chamber are also to be seen.

Figure 2B:
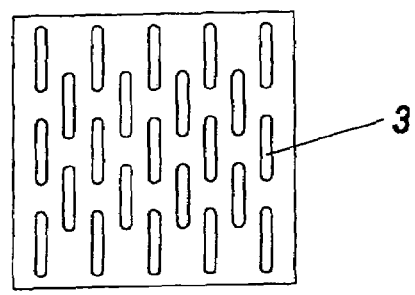
Figure 2C:
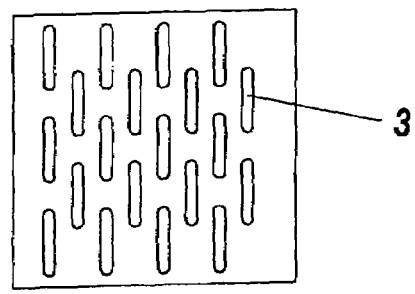
Figure 2D:
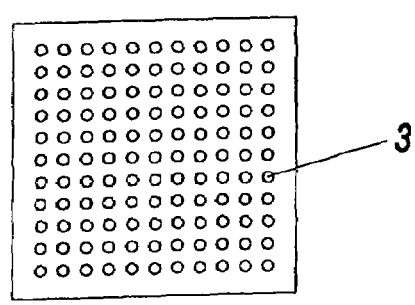

FIG. 2b shows a top view, identified as view A-A in FIG. 2a. FIG. 2c shows an analogous view along B-B and FIG. 2d shows an analogous view along C-C. The offset arrangement of the individual filter openings 3 as well as their adjustable size can again be seen.

Figure 3:
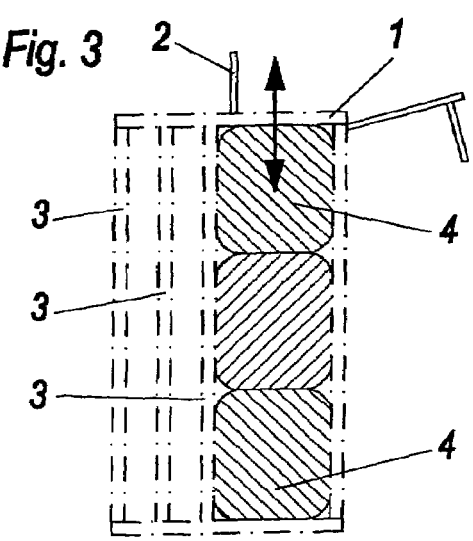
FIG. 3 shows a lateral section through an embodiment of a filter module according to the invention.

FIG. 3 shows a lateral section through an embodiment of a filter module according to the invention, from which the multi-chamber structure can again be seen. It can also be seen that one chamber of the filter module is able to be opened using the handle 2 and access to this chamber is thus possible. Three filter bags 4 are introduced into the chamber.

Figure 4A:
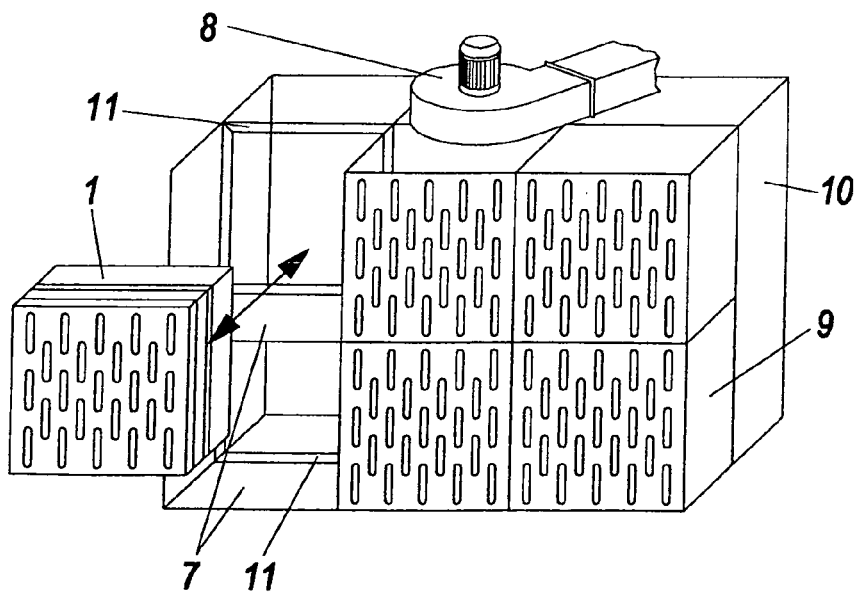
FIG. 4a shows a filter system with filter modules inserted.
Figure 4B:
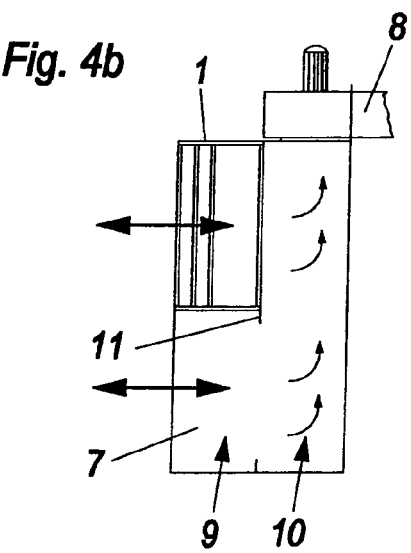

FIG. 4a shows in perspective view a modular filter system 6 in which the individual filter modules according to the invention can be inserted into the body of the filter system 6 in the plug-ins 7 up to the stops 11. A fan 8 is attached to the filter system. The filter system has a bicameral structure in this embodiment. The filter modules are inserted into the first chamber 9, while the second chamber 10 is connected to the fan, as can be seen from FIG. 4b. The air flow is indicated by arrows here.

Figure 5:
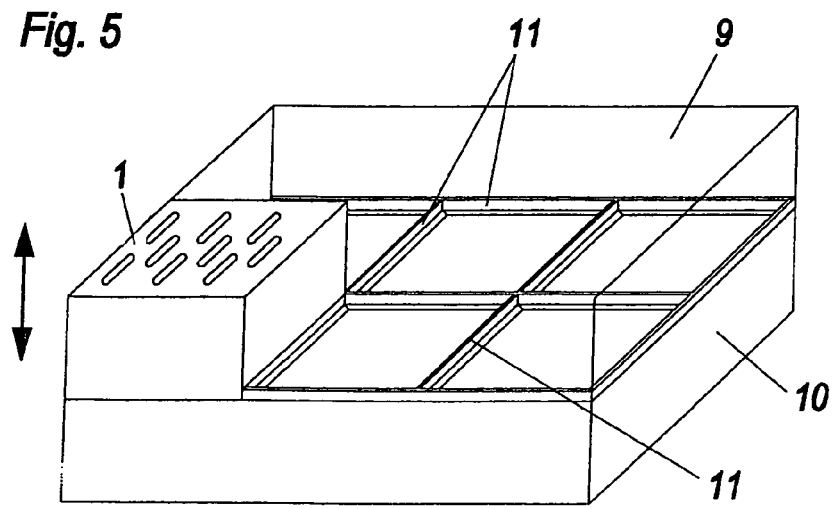
FIG. 5 shows a further version of a filter system according to the invention with a filter module inserted.

FIG. 5 shows a further version of a filter system 6 according to the invention, in which the filter system 6 is developed horizontal and the filter modules are inserted vertical into the plug-ins 7. The plug-ins 7 are again limited by stops 11.

The invention claimed is:

1. A filter module comprising:
   a hollow body having an outer wall and at least two successive inner walls arranged inside said hollow body, said hollow body comprising a non-metallic material which can be reduced or dissolved in a recycling process, said non-metallic material being a paper product or a fibrous material;
   wherein said outer wall has an inlet and an outlet for allowing a medium to pass through said hollow body so as to be filtered; and
   wherein said at least two successive inner walls have filter openings arranged to be smaller in a direction of flow of the medium through said hollow body.

2. The filter module of claim 1, wherein said non-metallic material is a biologically degradable material.

3. The filter module of claim 1, wherein said hollow body is roughly square.

4. The filter module of claim 1, wherein said hollow body is roughly cylindrical.

5. The filter module of claim 1, wherein the smallest side of said hollow body is roughly half the size of the largest side of said hollow body.

6. The filter module of claim 1, wherein said hollow body is formed by folding said non-metallic material.

7. The filter module of claim 1, further comprising a handle attached to said hollow body so as to be able to be countersunk into said outer wall or swung out from said outer wall.

8. The filter module of claim 1, wherein said hollow body is at least partially fire-protection impregnated.

9. The filter module of claim 1, wherein said at least two successive inner walls are arranged such that said filter openings are offset relative to one another.

10. The filter module of claim 1, wherein said at least two successive inner walls are arranged roughly parallel to each other.

11. The filter module of claim 1, further comprising a filter element arranged in said hollow body downstream of said at least two successive inner walls with respect to the direction of flow of the medium through said hollow body.

12. The filter module of claim 11, wherein said filter element comprises a bag filled with filter material.

13. The filter module of claim 1, wherein said hollow body is at least partially filled with filter material.

14. A filter module comprising:
a hollow body having an outer wall, a first inner wall, and a second inner wall, said first inner wall and said second inner wall being arranged in a successive manner inside said hollow body, said hollow body comprising a non-metallic material which can be reduced or dissolved in a recycling process, said non-metallic material being a paper product or a fibrous material;
wherein said outer wall has an inlet and an outlet for allowing a medium to pass through said hollow body so as to be filtered; and
wherein said first inner wall has first filter openings and said second inner wall has second filter openings, said first inner wall and said second inner wall being arranged such that said first filter openings and said second filter openings are offset relative to each other.

15. The filter module of claim 14, wherein said non-metallic material is a biologically degradable material.

16. The filter module of claim 14, wherein said hollow body is roughly square.

17. The filter module of claim 14, wherein said hollow body is roughly cylindrical.

18. The filter module of claim 14, wherein the smallest side of said hollow body is roughly half the size of the largest side of said hollow body.

19. The filter module of claim 14, wherein said hollow body is formed by folding said non-metallic material.

20. The filter module of claim 14, further comprising a handle attached to said hollow body so as to be able to be countersunk into said outer wall or swung out from said outer wall.

21. The filter module of claim 14, wherein said hollow body is at least partially fire-protection impregnated.

22. The filter module of claim 14, wherein said first inner wall and said second inner wall are arranged such that said filter openings are smaller in a direction of flow of the medium through said hollow body.

23. The filter module of claim 14, wherein said first inner wall and said second inner wall are arranged roughly parallel to each other.

24. The filter module of claim 14, further comprising a filter element arranged in said hollow body downstream of said first inner wall and said second inner wall with respect to a direction of flow of the medium through said hollow body.

25. The filter module of claim 24, wherein said filter element comprises a bag filled with filter material.

26. The filter module of claim 14, wherein said hollow body is at least partially filled with filter material.

* * * * *